United States Patent
Akhmatskaya et al.

(10) Patent No.: US 8,510,084 B2
(45) Date of Patent: Aug. 13, 2013

(54) METHOD, APPARATUS AND COMPUTER PROGRAM FOR MULTIPLE TIME STEPPING SIMULATION OF A THERMODYNAMIC SYSTEM USING SHADOW HAMILTONIANS

(75) Inventors: Elena Vitalievna Akhmatskaya, Chalfont St. Peter (GB); Sebastian Reich, Schwielowsee (DE)

(73) Assignee: Fujitsu Limited, Kawasaki (JP)

( * ) Notice: Subject to any disclaimer, the term of this patent is extended or adjusted under 35 U.S.C. 154(b) by 531 days.

(21) Appl. No.: 12/832,289

(22) Filed: Jul. 8, 2010

(65) Prior Publication Data

US 2011/0010147 A1     Jan. 13, 2011

(30) Foreign Application Priority Data

Jul. 9, 2009    (EP) .................................... 09165102

(51) Int. Cl.
*G06F 17/10*     (2006.01)
(52) U.S. Cl.
USPC ........................................................... 703/2
(58) Field of Classification Search
None
See application file for complete search history.

(56) References Cited

U.S. PATENT DOCUMENTS

| | | | | |
|---|---|---|---|---|
| 6,021,383 | A * | 2/2000 | Domany et al. | 702/181 |
| 6,052,677 | A * | 4/2000 | Masuoka et al. | 706/12 |
| 6,516,307 | B1 * | 2/2003 | Masuoka et al. | 706/12 |
| 7,908,129 | B2 * | 3/2011 | Akhmatskaya et al. | 703/11 |
| 2003/0046050 | A1 * | 3/2003 | Padilla et al. | 703/12 |
| 2008/0247991 | A1 * | 10/2008 | Trout et al. | 424/85.4 |
| 2009/0076780 | A1 * | 3/2009 | Akhmatskaya et al. | 703/2 |
| 2009/0112536 | A1 * | 4/2009 | Lustig | 703/2 |
| 2010/0190198 | A1 * | 7/2010 | Kibar et al. | 435/29 |
| 2011/0010147 | A1 * | 1/2011 | Akhmatskaya et al. | 703/2 |
| 2011/0077880 | A1 * | 3/2011 | Gering | 702/63 |

OTHER PUBLICATIONS

J. A. Izaguirre, S. Reich, R. D. Skeel, "Long time steps for molecular dynamics" Journal of Chemical Physics, vol. 110, No. 20, pp. 9853-9864, 1999.*
E. Akhmatskaya, S. Reich, "GSHMC: An efficient method for Molecular Simulation" Journal of Computational Physics 227 (2008), pp. 4934-4954.*
R. Zhang and H. Chen, "Lattice Boltzmann method for simulations of liquid-vapor thermal flows" pp. 1-6, 2003.*
Extended European Search Report mailed Jan. 11, 2010 for Corresponding European Application No. 09165102.6.
Zhidong Jia et al., "Geometric integrators for multiple time-scale simulation", Journal of Physics A. Mathematical and General, Institute of Physics Publishing, vol. 39, No. 19, May 12, 2006, pp. 5379-5403.

(Continued)

*Primary Examiner* — Saif Alhija
*Assistant Examiner* — Kibrom Gebresilassie
(74) *Attorney, Agent, or Firm* — Staas & Halsey LLP (57) ABSTRACT

A computer-implemented method including a momentum refreshment process and a conservative dynamics process, wherein the refreshment process including carrying out an operation of mixing the collective momentum vector with a noise vector and carrying out an acceptance/rejection (acceptance and rejection) operation; the dynamics process including applying a multiple time stepping conservative dynamics operation to a current state, in which calculations corresponding to more slowly varying energy parts undergo an averaging procedure and are carried out at a larger time step than calculations corresponding to more quickly varying energy parts; and carrying out an acceptance/rejection operation based on an approximation of the system energy expressed using shadow Hamiltonians and include accepting a current state or returning a replacement state.

14 Claims, 3 Drawing Sheets

(56) References Cited

OTHER PUBLICATIONS

Elena Akhmatskaya et al., "The Targeted Shadowing Hybrid Monte Carlo (TSHMC) Method", in B.L. et al., ed., *"New Algorithms for Macromolecular Simulations"*, vol. 49 of Lecture Notes in Computational Science and Engineering, Springer-Verlag, Berlin, pp. 142-153.

Elena Akhmatskaya et al., "GSHMC: An efficient method for molecular simulation", Journal of Computational Physics, vol. 227, No. 10, 2008, pp. 4934-4954.

Elena Akhmatskaya et al., "A comparison of generalized hybrid Monte Carlo methods with and without momentum flip", Journal of Computational Physics, vol. 228, pp. 2256-2265.

Hans C. Andersen, "Rattle: A "Velocity" Version of the Shake Algorithm for Molecular Dynamics Calculations", Journal of Computational Physics, vol. 52, pp. 24-34.

M. A. Balsera et al., "Principal Component Analysis and Long Time Protein Dynamics", Journal of Physical Chemistry, vol. 100, 1996, pp. 2567-2572.

Stephen D. Bond et al., "Molecular dynamics and the accuracy of numerically computed averages", *Acta Numerica*, vol. 16, 2007, pp. 1-65.

H. Grubmüller et al., "Generalized Verlet algorithm for efficient molecular dynamics simulations with long-range interactions", *Molecular Simulation*, vol. 6, 1991, pp. 121-142.

Wifred F. van Gunsteren et al., "Effect of Constraints on the Dynamics of Macromolecules", *Macromolecules*, 1982, vol. 15, pp. 1528-1544.

Ernst Hairer et al., "Geometric Numerical Integration", Springer-Verlag, Berlin Heidelberg, 2002.

Alan M. Horowitz, "A generalized guided Monte Carlo algorithm", Physics Letters B, vol. 268, No. 2, 1991, pp. 247-252.

Darryl D. Humphreys et al., "A Multiple-Time-Step Molecular Dynamics Algorithm for Macromolecules", Journal of Physical Chemistry, vol. 98, No. 27, 1994, pp. 6885-6892.

Jesús A. Izaguirre et al., "Shadow hybrid Monte Carlo: an efficient propagator in phase space of macromolecules", Journal of Computational Physics, vol. 200, 2005, pp. 581-604.

Jesús A. Izaguirre et al., "Longer time steps for molecular dynamics", Journal of Chemical Physics, vol. 110, No. 20, May 22, 1999, pp. 9853-9864.

Jesús A. Izaguirre et al., "Langevin Stabilization of Molecular Dynamics", Journal of Chemical Physics, vol. 114, 2090-2098, pp. 1-16.

A.D. Kennedy et al., "Cost of the generalized hybrid Monte Carlo algorithm for free field theory", Nuclear Physics B, vol. 607 [FS], 2001, pp. 456-510.

István Kolossváry et al., "Hessian-free low-mode conformational search for large-scale protein loop optimization: application to *c-jun* N-terminal kinase JNK3", Journal of Computational Chemistry, vol. 22, No. 1, 2001, pp. 21-30.

Chze Ling Wee et al., "Improved Sampling for Simulatiqns of Interfacial Membrane Proteins: Application of Generalized Shadow Hybrid Monte Carlo to a Peptide Toxin/Bilayer System", Journal of Physical Chemistry B, vol. 112, No. 18, 2008, pp. 5710-5717.

Guihua Zhang et al., "LIN: A New Algorithm to Simulate the Dynamics of Biomolecules by Combining Implicit-Integration and Normal Mode Techniques", Journal of Computational Chemistry, vol. 14, No. 10, pp. 1212-1233.

Zhiyong Zhang et al., "Molecular Dynamics Simulations of Peptides and Proteins with Amplified Collective Motions", Biophysical Journal, vol. 84, Jun. 2003, pp. 3583-3593.

B. Leimkuhler et al., "Simulating Hamiltonian Dynamics", *Geometric integrators*, Cambridge University Press, Cambridge, pp. 70-104.

Michael Levitt et al., "Protein Normal-mode Dynamics: Trypsin Inhibitor, Crambin, Ribonuclease and Lysozyme", Journal of Molecular Biology, vol. 181, 1985, pp. 423-447.

J. Liu, "Monte Carlo strategies in scientific computing", Springer-Verlag, New York, 30 pp.

Qun Ma et al., "Verlet-I/R-Respa/Impulse is limited by nonlinear instabilities", SIAM Journal on Scientific Computing, vol. 24, No. 6, pp. 1951-1973.

R. Pastor et al., "An analysis of the accuracy of Langevin and molecular dynamics algorithms", Molecular Physics, 1988, vol. 65, No. 6, pp. 1409-1419.

Jean-Paul Ryckaert et al., "Numerical Integration of the Cartesian Equations of Motion of a System with Constraints: Molecular Dynamics of *n*-Alkanes", Journal of Computational Physics, 1977, vol. 23, pp. 327-341.

Robert D. Skeel et al., "Practical Construction of Modified Hamiltonians", SIAM Journal on Scientific Computing, vol. 23, No. 4, pp. 1172-1188.

Brian Space et al., "Long time scale molecular dynamics subspace integration method applied to anharmonic crystals and glasses", Journal of Chemical Physics, vol. 99, No. 11, Dec. 1, 1993, pp. 9070-9079.

Christopher R. Sweet et al., "Normal Mode partitioning of Langevin dynamics for biomolecules", The Journal of Chemical Physics, vol. 128, No. 14, 2008, 145101, pp. 1-13.

Chze Ling Wee et al., "Improved Sampling for Simulations of Interfacial Membrane Proteins: Application of Generalized Shadow Hybrid Monte Carlo to a Peptide Toxin/Bilayer System", Journal of Physical Chemistry B, vol. 112, No. 18, 2008, pp. 5710-5717.

\* cited by examiner

METHOD, APPARATUS AND COMPUTER PROGRAM FOR MULTIPLE TIME STEPPING SIMULATION OF A THERMODYNAMIC SYSTEM USING SHADOW HAMILTONIANS

CROSS-REFERENCE TO RELATED APPLICATION

This application is based upon and claims the benefit of priority from European Patent Application No. 09165102.6 filed on Jul. 9, 2009, the entire contents of which are incorporated herein by reference.

FIELD OF THE INVENTION

The present invention relates to simulation of thermodynamic systems. In such simulations, physical characteristics and changes in the system can be modelled. The invention has applications in the modelling of physical, chemical and biological systems in particular. For example, embodiments of the invention can use an atomistic model to represent simple, complex and even extremely large biomolecular systems such as whole viruses. There are many applications for such simulation, for example in biosciences, material sciences and in public health and medicine.

BACKGROUND OF THE INVENTION

Molecular dynamics (MD) is a useful technique for theoretical investigation of molecular systems such as biomolecular systems and other macromolecular systems. A primary limitation in the application of MD to the study of complex processes involving macromolecules, e.g. biomolecules, is the small time step size of conventional MD. Whereas the latter is typically measured in femtoseconds, some dynamical processes of interest happen in microseconds and longer time scales. Bridging the time scale gap between simulations and the phenomena of interest has been an area of active research for more than a decade. A variety of techniques have been introduced in order to increase the time step in molecular dynamics simulations.

One common approach is to constrain bond lengths using either the SHAKE (Ryckaert et al., 1977) or RATTLE (Anderson, 1983) algorithms. Although application of these methods allows for a modest (~ a factor of 2) increase in the time step, time-dependent quantities may be affected. Additionally, the constraint methods have not been shown to work well for bond angle degrees of freedom when applied to the case of macromolecules (van Gunsteren et al., 1982).

Figure 1:
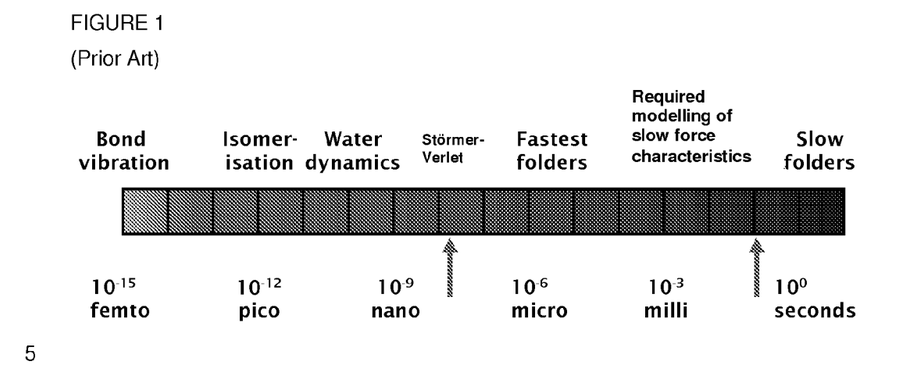
FIG. 1 depicts the dynamics of molecules such as protein molecules.

An additional complication is that biological and some other complex systems are multi-scale in nature. For example, the dynamics of proteins contain motions over different time scales, from atomic vibrations in the order of femtoseconds to collective motions at millisecond scales. FIG. 1 depicts the dynamics of molecules such as protein molecules, to illustrate the variation in time scales.

Traditional time stepping integrators (e.g. Verlet) commonly used in molecular dynamics (MD) are not able to address this time scale problem. A typical time-step for these methods is 1 femtosecond. This makes atomistic simulation of biomolecules computationally extremely expensive. Multi-scale numerical methods, in which the presence of fast scales does not affect the time integration of slow scales, are urgently needed for efficient simulation of large biomolecular systems. Such approaches, in theory, can essentially enhance performance of molecular simulation since the most computationally expensive long-range electrostatic interactions contribute to the dynamics on relatively long time scales (compared with internal vibrations) and thus ideally do not need to be calculated frequently. Also, such approaches enhance the data locality which makes them better suited for implementation on parallel computers than traditional MD schemes.

One approach is to separate the dynamics into fast, uninteresting modes, and slow, functionally relevant modes and perform MD in the reduced space. Among the most popular approaches to find reduced dynamical spaces for biomolecules are normal mode analysis (NMA) (Levitt et al., 1985) and principal component analysis (PCA) (Balsera et al., 1996). Those methods have been combined with various computational schemes (e.g. LIN (Zhang et al., 1993), ACM (Zhang et al., 2003), LLMOD (Kolossvary et al., 2001), SMD (Space et al., 1993), NML (Sweet et al., 2008)) to yield simulation techniques which, in fact, have not succeeded in either providing the desired accuracy or in achieving substantial computational speed-up (Sweet et al., 2008) for atomistic simulation of macromolecules.

Other work has attempted to build multiple time step (MTS) integrators for MD that allow for time steps of differing lengths according to how rapidly a given type of interaction is evolving in time. The prototypical algorithm is the Verlet-I/r-RESPA/Impulse integrator (Grubmüller et al., 1991; Humphreys et al., 1994), which splits the forces into fast (short-range) and slow (long-range) components and evaluates the former more frequently than the latter. The ratio between frequencies of evaluation of the long-range forces (outer step-size) and short-range forces (inner step-size) measures the gain in simulation time and will be further referred to as "the step-size ratio".

Figure 2:
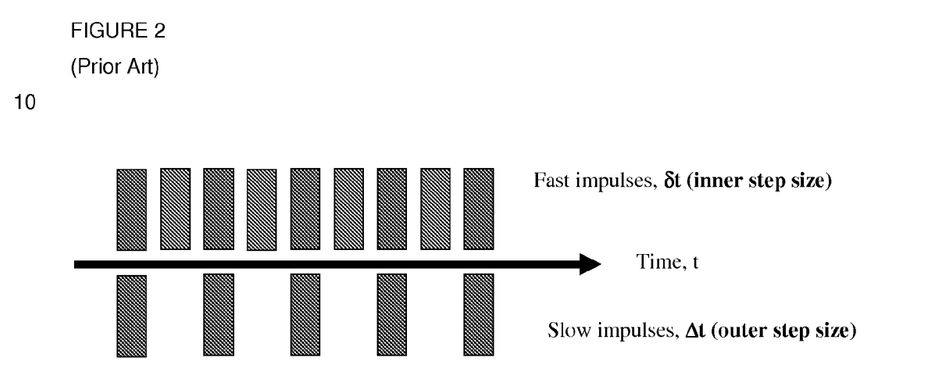
FIG. 2 is a diagramatic explanation of the MTS idea.

FIG. 2 is a diagramatic explanation of the MTS idea, which splits the forces in a system into bonded "fast" forces and long range non bonded "slow" forces (which tend to be non-linear), evaluating the slow forces less frequently. For this, multiple timestepping integrators are required to solve modified ODEs (Ordinary Differential Equations).

For biomolecular applications, the computational complexity of the fast short-range force evaluations scales linearly in the number of atoms in the system, N, while it scales quadratically in N for the slow long-range force evaluations. Furthermore, while the short-range fast forces are easy to compute in parallel, long-range slow forces require global data communication and hence are more difficult to parallelize efficiently. Therefore, in theory, MTS methods can dramatically speed up MD simulations by reducing the number of expensive slow force evaluations.

Although in theory MTS methods can dramatically speed up MD simulations by reducing the number of expensive slow force evaluations, in practice, however, impulse MTS methods such as the popular Verlet-I/r-RESPA suffer from severe resonance instabilities that limit practical performance gain (Ma et al., 2003; Izaguirre et al., 2001). For solvated biomolecular systems, for example, the stability limit means that the "the step-size ratio" becomes equal to ~4. Performance of impulse MTS methods was recently improved in the Langevin stabilized MTS methods (Izaguirre et al., 2001) by reducing resonance induced instabilities through the introduction of mollified MTS methods by Izaguirre et al., 1999 and weak coupling to a stochastic heat bath (Langevin dynamics) (Izaguirre et al., 2001) to weaken non-linear instabilities. This allowed an increase of the step-size ratio to 6-12 for solvated biomolecular systems (Izaguirre et al., 1999, 2001).

In addition to the limitations which are specific to each listed method, all those methods have a common drawback— they do not exactly sample from the target temperature even if the simulations are stable and are subject to a thermostat (Pastor et al., 1988; Bond and Leimkuhler, 2007). This error can be controlled with a loss of computational efficiency by increasing the frequency of slow force updates.

It is desirable to provide a method and apparatus for simulation which overcome or at least mitigate some of the disadvantages of the prior art.

SUMMARY OF THE INVENTION

Embodiments of the invention provide a computer-implemented method of simulating behaviour of a thermodynamic system over time, the thermodynamic system having potential energy that can be split into more quickly varying parts and more slowly varying parts and having a state described by collective vectors of position and momentum at any given time, the method comprising a momentum refreshment process and a conservative dynamics process, wherein the momentum refreshment process comprises carrying out an operation of mixing the collective momentum vector with a noise vector and carrying out an acceptance/rejection operation; the conservative dynamics process comprises applying a multiple time stepping conservative dynamics operation to a current state, in which operation calculations for forces corresponding to more slowly varying energy parts in the thermodynamic system undergo an averaging procedure and are carried out at a larger time step than calculations for forces corresponding to more quickly varying energy parts; and carrying out an acceptance/rejection operation; and wherein the acceptance/rejection operations are based on an approximation of the system energy expressed using shadow Hamiltonians and comprise accepting a current state or returning a replacement state.

The inventors have developed a novel method for constant temperature molecular simulation of large systems, embodiments of which take can advantage of the multi-scale nature of the simulated systems and remove or at least mitigate some of the bottlenecks of existing multi-scale methods.

Embodiments of the new method are referred to herein as MTS-GSHMC (in which GSHMC stands for Generalized Shadow Hybrid Monte Carlo) and can provide accurate reproduction of thermodynamic and dynamical properties; exact temperature control during simulation; and computational robustness and efficiency.

More specifically, embodiments of the invention allow use of a newly developed technique for approximating system potential energy H, known as the Hamiltonian, in a simulation with MTS, preferably by using shadow Hamiltonians, which are truncated or otherwise approximated versions of the expression for potential energy, thus improving performance of the method. The embodiments use the principles of a simulation method not previously thought suitable for MTS, known as the GSHMC method (Akhmatskaya & Reich, 2008).

In more detail, embodiments of the invention can:
1. enable efficient detailed atomistic simulations of extremely large macromolecular systems;
2. offer the following advantages over existing MTS implementations:
    stability: MTS-GSHMC does not suffer from resonance or non-resonance induced instabilities;
    accuracy: MTS-GSHMC rigorously samples from the constant temperature ensemble;
    efficiency: MTS-GSHMC is able to reduce the frequency of calculation of expensive slow forces by a factor of ~20 compared with traditional MD methods and by a factor of ~2 over the best performing MTS approaches;
    applicability: MTS-GSHMC will be considerably more efficient than standard techniques when applied to a wide range of atomistic models: from very simple ones to extremely large biomolecular systems (e.g. whole viruses). The results would be a valuable contribution in materials science and biosciences and will eventually contribute to public health and medicine;
    suitability to massively parallel computing.

In addition, MTS-GSHMC reduces the computational cost of the MD part by a factor of 2 compared with related costs in the comparable in-house related art process without shadow Hamiltonians, which is known as MTS-GHMC and is the subject of a co-pending European application with the same applicant and inventors, entitled "A Method, Apparatus and Computer Program for Multiple Time Stepping simulation of a Thermodynamic System" with agent reference P113088EP00. The co-pending application is hereby incorporated by reference. MTS-GSHMC improves the achievable effective step-size ratios observed in MTS-GHMC by a factor of 1.4; and provides efficient sampling in simulation of complex systems.

We have found that the acceptance rate in the molecular dynamics part of MTS-GHMC quickly deteriorates for large outer time-steps (i.e., the equivalent of 16 to 20 fs for solvated biomolecular systems). Shadow Hamiltonians can be used to address this issue.

A key factor in the development of invention embodiments is the derivation of shadow Hamiltonians for the mollified MTS methods of Izaguirre et al., 1999. This step is necessary since the shadow Hamiltonians previously used, for example in Akhmatskaya and Reich, 2008, are specific to the single time-step Störmer-Verlet method. To overcome this limitation, the inventors utilised and modified a highly efficient method for evaluating shadow Hamiltonians as proposed by Skeel and Hardy, 2001 for symplectic splitting methods (Hairer et al., 2002; Leimkuhler and Reich, 2005). Due to the multi-scale nature of MTS methods, a substantial modification of the approach of Skeel and Hardy, 2001 was required to make it applicable to the MTS-GHMC method of Reich and Akhmatskaya, 2009.

Preferably, the conservative dynamics process uses a mollified impulse method for stability improvement, for example using a process in which an averaging operator A is applied to a collective position vector X and derives mollified potential energy $U_{molly}^{slow}$ related to the more slowly varying potential energy, to yield more slowly varying mollified forces $F_{molly}^{slow}$, and preferably wherein calculated properties are re-weighted at the end of the entire method, to allow for the use of the mollified terms and shadow Hamiltonians.

Advantageously, the mollified multiple time stepping method applies the operator A to the collective position vector X and derives the mollified potential energy $U_{molly}^{slow}$ related to the more slowly varying potential energy to yield more slowly varying forces mollified forces $F_{molly}^{slow}$, wherein:

$$M \frac{d^2}{dt^2} X(t) = \sum_{m=0}^{L} c_m \Delta t \delta_x(t - m\Delta t) F_{molly}^{slow}(X(t)) + \sum_{n=0}^{pL} d_n \delta t \delta_x(t - n\delta t) F^{fast}(X(t)),$$

for $t \in [0, t' = L\Delta t]$ with the slow forces defined by $$F_{molly}^{slow}(X) = -\nabla U_{molly}^{slow}(X) = A_X(X)^T F^{slow}(A(X)),$$

where M is a diagonal mass matrix of atomic masses, $A_X(X)$ denotes the Jacobian matrix of partial derivatives, the larger time-step for more slowly varying forces $F^{slow}$ is $\Delta t$, the smaller time-step for more quickly varying forces $F^{fast}$ is $\delta t$, $\delta_x$ is the Dirac delta function, $c_m = d_n = 1$ except when $m = n = 0$ or $m = L$, $n = pL$, respectively, in which case $c_m = d_n = \frac{1}{2}$, integer $p > 1$, and $L > 0$ is a given integer.

Either the momentum refreshment or the conservative dynamics process is the first process of the method, and the resulting state of any process in the method preferably provides the current state for the next process in the method.

Advantageously, the acceptance/rejection operation following the mixing operation returns the resulting state of the mixing operation in the case of acceptance and the state before the mixing operation as the replacement state in the case of rejection; and the acceptance/rejection operation following the conservative dynamics operation returns the resulting state of the conservative dynamics operation in the case of acceptance; and, in the case of rejection, the state before the conservative dynamics operation is either returned as the replacement state or undergoes a momentum flip to provide the replacement state.

Preferably the momentum refreshment process and/or the conservative dynamics process constitutes a multiple iteration process, in which the entire process is repeated a selected number of times consecutively, to provide a final resulting state, which may be used as a current state for the next process. Usually, the method as a whole is also repeated, for example so that the results of the acceptance/rejection operation in the conservative dynamics process are fed into the momentum refreshment process in a further iteration of the method.

Any suitable methodology can be used for combining the collective momentum vector with a noise vector in the momentum refreshment process. In one suitable method, the states in the method may be denoted by $\Omega_i = (Y_i^T, t_i)^T$, $i = 0, \ldots, I$, where I is a given integer, $Y_i = (X_i^T, 1, P_i^T, b_i)^T$, $X_i$ a collective vector of atomic positions, $P_i$ is a collective vector of atomic momenta, $b_i$ is a scalar, and $t_i$ is time and wherein the mixing operation comprises: given a current state, mixing its collective atomic momentum vector $P_i$ with an independent and identically distributed normal noise vector $\Xi_i$ of dimension 3N, so that $$\tilde{P}_i = \cos(\phi) P_i + \sin(\phi) \Xi_i,$$

$$\tilde{\Xi}_i = \cos(\phi) \Xi_i - \sin(\phi) P_i,$$

where i is a given integer, N is the number of particles in the system, $0 < \phi \leq \pi/2$ is a given angle, $\Xi_i \sim N[0, \beta M^{-1}]$, $N[0, \beta M^{-1}]$ denotes the (3N)-dimensional normal distribution with zero mean and covariance matrix $\beta m^{-1}$, M is the diagonal mass matrix of the molecular system, and $\beta = 1/k_B T$ is the inverse temperature, the proposed state vector being denoted by $\tilde{\Omega}_i = (\tilde{Y}_i^T, t_i)^T$, $\tilde{Y}_i = (X_i^T, 1, \tilde{P}_i^T, b_i)^T$; and preferably wherein the subsequent acceptance/rejection operation comprises obtaining the resulting state $\overline{\Omega}_i$; through a Metropolis accept/reject criterion:

$$\overline{\Omega}_i = \begin{cases} \tilde{\Omega}_i & \text{with probability } \min(1, \exp(-\beta \Delta H_{\Delta t}^e)) \\ \Omega_i & \text{otherwise,} \end{cases}$$

with $$\Delta H_{\Delta t}^e := H_{\Delta t}(X_i, \tilde{P}_i) + \frac{1}{2}\tilde{\Xi}_i^T M^{-1} \tilde{\Xi}_i - H_{\Delta t}(X_i, P_i) - \frac{1}{2}\Xi_i^T M^{-1} \Xi_i,$$

in which $H_{\Delta t}$ is the shadow Hamiltonian and $\Delta H_{\Delta t}^e$ is the change in shadow Hamiltonian due to the mixing operation.

Turning to the conservative dynamics process, each iteration of the process will usually include describing the forces of the atoms of the molecules of the molecular system using the chosen force field, integrating Newton's equation to predict the positions and velocities and recalculation of the forces.

The multiple time stepping method is carried out so that the calculations for more quickly varying forces (usually those relating to forces over a shorter distance range) are carried out more frequently than calculations for more slowly varying forces.

The conservative dynamics operation may comprise applying the multiple time stepping method to the current state $\overline{\Omega}_i^+ = (\overline{Y}_i^T, t_i)^T$ with $\overline{Y}_i = (X_i^T, 1, \overline{P}_i^T, b_i)^T$ using a time-reversible and volume conserving mapping $\Psi_\tau$, with the proposed state being defined by:

$$\hat{\Omega}_i = (\hat{Y}^T, t_i + L\Delta t)^T, \text{ with } \hat{Y}_i = \hat{\Psi}_\tau(\overline{Y}_i)$$

with $\tau = \Delta t L$ and given integer $L \geq 1$; and the subsequent acceptance/rejection operation may comprise obtaining the resulting state $\Omega_{i+1}$, through a Metropolis accept/reject criterion:

$$\Omega_{i+1} = \begin{cases} \hat{\Omega}_i & \text{with probability } \min(1, \exp(-\beta \Delta H_{\Delta t})) \\ \overline{\Omega}_i^+ & \text{otherwise,} \end{cases}$$

with $$\Delta H_{\Delta t} := H_{\Delta t}(\hat{X}_i, \hat{P}_i) - H_{\Delta t}(X_i, \overline{P}_i),$$

in which $H_{\Delta t}$ is the shadow Hamiltonian and $\Delta H_{\Delta t}$ is the change in shadow Hamiltonian due to the conservative dynamics operation; and in which $\overline{\Omega}_i^- = (\overline{Y}_i^{-T}, t_i)^T$, $\overline{Y}_i^- = (X_i^T, 1, -\overline{P}_i^T, b_i)^T$, $\overline{\Omega}_i^\pm$ denotes either $\overline{\Omega}_i^-$ or $\overline{\Omega}_i^+$ and $\overline{\Omega}_i^-$ indicates applying a momentum flip to the state $\overline{\Omega}_i$ and $\overline{\Omega}_i^+ = \overline{\Omega}_i$ and indicates that no momentum flip is applied.

Any suitable approximation truncation for the Hamiltonian can be used as the shadow Hamiltonian. Preferably, the shadow Hamiltonian used can be expressed as:

$$H_{\Delta t}^{[q]} = H_{\Delta t}^{[q],MTS} - H_{\Delta t}^{[q],MTS,fast} + H_{\delta t}^{[q],SV,fast},$$

in which $H_{\Delta t}^{[q],MTS}$ denotes the q th order shadow Hamiltonian for an MTS method, $H_{\Delta t}^{[q],MTS,fast}$ denotes the q th order shadow Hamiltonian for the same MTS method with the more slowly varying forces $F^{slow}$ set equal to zero and $H_{\delta t}^{[q],SV,fast}$ denotes the q th order shadow Hamiltonian for a Störmer-Verlet method applied to the more quickly varying forces in the system, with step-size $\delta t$.

In order to use the method on a computer, initial conditions or parameters need to be input manually or automatically. Thus the method may further comprise a step of initially accepting input of simulation conditions, wherein the simulation conditions include at least one of volume, mass, temperature, pressure, number of particles, and total energy; and/or further comprising a step of initially accepting input of simulation parameters, wherein the simulation parameters include at least one of a number of repetitions of the momentum refreshment process and a number of repetitions of the conservative dynamics process, the larger and smaller time step in conservative dynamics, the number of iterations of the entire method, the current state for the first step in the method, the force field parameters, a time-reversible and volume conserving mapping $\Psi_\tau$, and a constant angle $\phi$, where $0 < \phi \leq \pi/2$.

At the end of the method, the results may be displayed on a screen or printout.

To put the method into the context of the full simulation, a method of molecular simulation of a system over time can be provided, comprising:
modelling the system using an atomistic model;
carrying out the method of simulating behaviour of a thermodynamic system according to any of the preceding claims; and analysing the results obtained from the simulation and relating them to macroscopic level properties.

Embodiments of another aspect of the invention provide an apparatus which simulates behaviour of a thermodynamic system over time, the thermodynamic system having potential energy that can be split into more quickly varying parts and more slowly varying parts and having a state described by collective vectors of position and momentum at any given time; the apparatus comprising:

a momentum refreshment part operable to carry out an operation of mixing the collective momentum vector with a noise vector and an acceptance/rejection operation;

a conservative dynamics part operable to apply a multiple time stepping conservative dynamics operation to a current state, in which operation calculations for forces corresponding to more slowly varying energy parts in the thermodynamic system undergo an averaging procedure and are carried out at a larger time step than calculations for forces corresponding to more quickly varying energy parts; and to carry out an acceptance/rejection operation; wherein the acceptance/rejection operations are based on an approximation of the system energy expressed using shadow Hamiltonians and comprise accepting a current state or returning a replacement state.

The preferred features of the above method statements are also applicable to this apparatus aspect and to the following computer program aspect.

In any of the above aspects, the various features may be implemented in hardware, or as software modules running on one or more processors.

The method is preferably carried out by a computer or computer network, the specification and arrangement of such computing functionality being well known to a person skilled in the art of molecular simulation.

The invention thus also provides a computer program or a computer program product for carrying out any of the methods described herein, and a computer readable medium having stored thereon a program for carrying out any of the methods described herein. A computer program embodying the invention may be stored on a computer-readable medium, or it could, for example, be in the form of a signal such as a downloadable data signal provided from an Internet website, or it could be in any other form.

The present invention can be implemented to give many advantages over the prior art methods for simulating multi-scale systems, for example over a range of thermodynamic ensembles such as NPT and NVT ensembles.

General features of the prior art and preferred features of the present invention will now be described, purely by way of example, with reference to the accompanying drawings, in which:

DETAILED DESCRIPTIONS OF THE EMBODIMENTS

Embodiments of the invention combine an MTS method with Monte Carlo methodology and shadow Hamiltonians. It is a well-known problem of hybrid, Monte Carlo (HMC) and generalized hybrid Monte Carlo (GHMC) methods that the acceptance rate of the molecular dynamics proposal step deteriorates with increasing time-steps and increasing system sizes (Kennedy and Pendleton, 2001). One option to counteract this effect is to apply higher-order symplectic time-stepping methods. However this also increases the computational cost of HMC/GHMC. An alternative, less expensive approach has been proposed by Izaguirre and Hampton, 2004 for HMC and by Akhrnatskaya and Reich, 2006, 2008 for GHMC and is based on the concept of modified/shadow Hamiltonians for symplectic time-stepping methods. The key observation is that symplectic time-stepping methods (see Hairer et al., 2002; Leimkuhler and Reich, 2005 for an introduction to sympletic methods and modified equation analysis) conserve modified/shadow Hamiltonians/energy to much higher accuracy than the accuracy of the method itself. This suggests to implement HMC/GHMC in the framework of importance sampling with respect to such shadow Hamiltonians. The feasibility of the generalized shadow hybrid Monte Carlo (GSHMC) approach (Akhmatskaya and Reich, 2008) for large biomolecular systems has been demonstrated by Wee et al., 2008.

Figure 3:
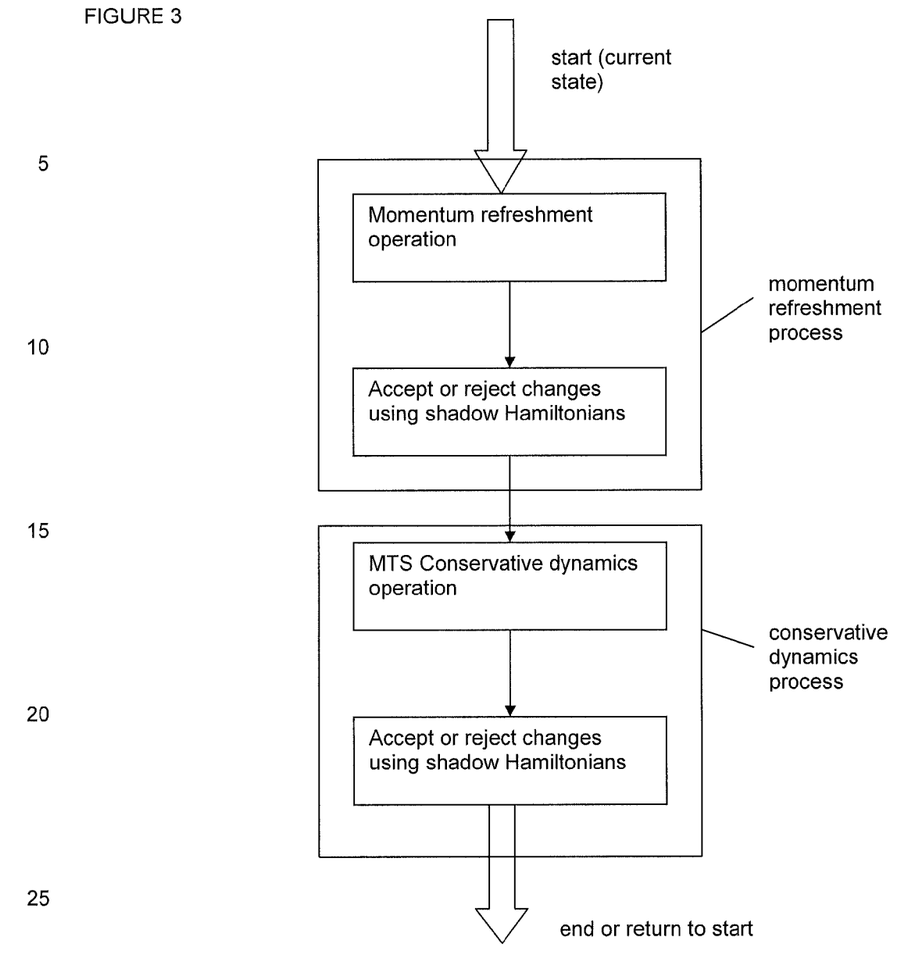
FIG. 3 is a flowchart showing a general embodiment of the invention.

FIG. 3 shows a general embodiment of the invention in which a momentum refreshment process is followed by an MTS conservative dynamics process. The method may be repeated so that the results of the conservative dynamics process are fed back into the start of the momentum refreshment process. Each of the two processes involves an acceptance/rejection operation using shadow Hamiltonians. In more detail, for the momentum refreshment process, the momentum only of the current state is refreshed and the results are tested. If the changes are rejected the system returns to the start state or current state before the momentum refreshment operation. There follows a conservative dynamics operation whose results again are accepted or rejected. If the results are rejected, the results of the momentum refreshment process are returned or these results are subjected to a momentum flip to form the returned state. Otherwise, for acceptance, the results of the conservative dynamics operation are applied.

To be able to extend GSHMC to MTS-methods using Monte Carlo methodology we need to establish easily computable shadow Hamiltonians for the mollified MTS methods of Izaguirre et al., 1999. In the remainder of this section, we describe the key construct proposed by Skeel and Hardy, 2001.

The molecular dynamics (MD) proposal step of HMC/GHMC requires the solution of Newton's equations of motion for a classical unconstrained simulation $$M\ddot{X} = -\nabla U(X), \quad (1)$$

where M is the diagonal mass matrix of atomic masses, X is the collective atomic position vector, $\ddot{X}$ denotes its second time derivative, and U is the potential energy. Newton's equations of motion (1) can be put into the Hamiltonian dynamics framework by introducing the collective atomic momentum vector P=MẊ and the Hamiltonian (energy)

$$H(X, P) = \frac{1}{2}P^T M^{-1} P + U(X). \tag{2}$$

The associated canonical Hamiltonian equations of motion are given by $$\dot{X}=\nabla_P H(X,P)=M^{-1}P, \dot{P}=-\nabla_X H(X,P)=-\nabla U(X). \tag{3}$$

We assume that there are N atoms and, hence, X, P∈R$^{3N}$.

Following Skeel and Hardy, 2001, we define the homogeneous of degree two extension of a Hamiltonian H(X,P) by $$H(X,a,P,b)=a^2 H(a^{-1}X, a^{-1}P), \tag{4}$$

where a∈R and b∈R are two additional degrees of freedom. The associated extended state variable is defined by Y=(X$^T$, a, P$^T$, b)$^T$∈R$^{6N+2}$ and its extended Hamiltonian dynamics is defined by $$\dot{X}=\nabla_P H(y)=M^{-1}P, \tag{5}$$

$$\dot{a}=\nabla_b H(y)=0, \tag{6}$$

$$\dot{P}=-\nabla_X H(y)=-a\nabla U(a^{-1}X), \tag{7}$$

$$\dot{b}=-\nabla_a H(y)=X^T\nabla U(a^{-1}X)-2aU(a^{-1}X). \tag{8}$$

Recall that Y$^T$ denotes the transpose of a vector Y, i.e., Y$^T$ is a row vector if Y is a column vector and vice versa. The Hamiltonian H(Y) is called homogeneous of degree two since σ$^2$H(Y)=H(σY) for any scale factor σ∈R and for all extended states Y.

Since $\dot{a}$=0, we may set a=1 and obtain the simplified equations of motion $$\dot{X}=M^{-1}P, \dot{P}=-\nabla U(X), \dot{b}=X^T\nabla U(X)-2U(X). \tag{9}$$

Let Y(t)=(X(t)$^T$,1,P(t)$^T$,b(t)$^T$) denote a solution of (9). A key result of Skeel and Hardy, 2001 states that $$H(X(t), P(t)) = \frac{1}{2}\left\{\dot{X}(t)^T P(t) - \dot{P}(t)^T X(t) - \dot{b}(t)\right\} \tag{10}$$

$$= \frac{1}{2}\dot{Y}(t)^T J Y(t),$$

which, using (9), is easy to verify. Here J is the skew-symmetric matrix $$J = \begin{bmatrix} 0_{3N+1} & I_{3N+1} \\ -I_{3N+1} & 0_{3N+1} \end{bmatrix} \in R^{(6N+2)\times(6N+2)} \tag{11}$$

and I$_{3N+1}$ denotes the identity matrix of dimension 3N+1, N the number of atoms.

Another important observation is that the above arguments hold true for any Hamiltonian H(X,P) and in particular for the modified Hamiltonians H$_{\Delta t}$(X,P) of a symplectic time-stepping method, which defines a mapping $$\Gamma_{n+1}=\Psi_{\Delta t}(\Gamma_n),$$

Γ=(X$^T$,P$^T$)$^T$∈R$^{6N}$. See Hairer et al., 2002; Leimkuhler and Reich, 2005 for an introduction to symplectic time-stepping methods and modified equation analysis for such methods. Modified Hamiltonians are defined such that they are conserved to an order in the step-size Δt which is higher than the order of the method itself. Recursive formulas for computing modified Hamiltonians are known; but are typically not viable for practical computations (Hairer et al., 2002; Leimkuhler and Reich, 2005). The homogeneous embedding approach on the other hand allows for a relatively simple computation of modified Hamiltonians along numerical trajectories.

Details of the construction will be provided later. Here we only outline the basic idea. Let $\tilde{\Psi}_{\Delta t}$ denote the natural extension of a symplectic time-stepping method (12) to the extended system (9), i.e., $$Y_{n+1}=\tilde{\Psi}_{\Delta t}(Y_n). \tag{13}$$

Let Π(t) denote an interpolation polynomial of order 2k, k>0, through discrete solution points Y$_n$, n=−k, ..., 0, ..., +k. Then we define a modified energy value at t=t$_0$ by $$H_{\Delta t}(X_0, P_0) = \frac{1}{2}\dot{\Pi}(t)^T J\Pi(t), \tag{14}$$

with skew-symmetric matrix J defined by (11) and Y$_0$=(X$_0^T$, 1, P$_0^T$, 0)$^T$. The accuracy of the modified Hamiltonian increases with the number of time-steps 2k>0. With k=1 one can achieve fourth-order while k=2 leads to an eighth-order modified Hamiltonian in Δt.

Shadow Hamiltonians for Multiple-Time-Stepping Methods

Homogeneous Embedding of Mollified MTS Method

The potential energy U is typically formed from a combination of bonded and nonbonded potential energy (U$^{bonded}$+U$^{nonbonded}$) where $$U=U^{bonded}+U^{nonbonded}, \tag{14A}$$

$$U^{bonded}=U^{bond}+U^{angle}+U^{dihedral}+U^{improper}, \tag{14B}$$

$$U^{nonbonded}=U^{Leonard-Jones}+U^{electrostatics}, \tag{14C}$$

Let r$_{ij}$≧0 denote the distance between atom i and atom j. The switching function S serves to split non-bonded interactions into slow and fast parts. It is defined by $$S(r_{ij}) = \begin{cases} 0 & \text{if } r_{ij} > r_{cutoff}, \\ 1 & \text{if } r_{ij} < r_{on}, \\ \frac{(r_{cutoff}^2 - r_{ij}^2)(r_{cutoff}^2 + 2r_{ij}^2 - 3r_{on}^2)}{(r_{cutoff}^2 - r_{on}^2)} & \text{if } r_{on} \leq r_{ij} \leq r_{cutoff}, \end{cases} \tag{14D}$$

for given cutoff radius r$_{cutoff}$ and transition interval defined by [r$_{on}$, r$_{cutoff}$]. Given a potential energy U with entries defined by (14A)-(14C) we now define the "fast" potential by $$U_{fast}=U^{bonded}+U^{nonbonded}S \tag{14E}$$

and the slow contribution by $$U^{slow}=U^{nonbonded}-U^{nonbonded}S. \tag{14F}$$

Let us assume that a splitting of the potential energy U(X) into fast and slow contributions is given, i.e.

$$U(X)=U^{fast}(X)+U^{slow}(X). \tag{15}$$

We also assume an operator $$\bar{X}=A(X) \tag{16}$$

which assigns a filtered, averaged position $\bar{X}$ to an instantaneous collective atomic position vector X. The averaging operator may then be applied to the slow potential to yield a mollified slow potential in embodiments for which mollified potential energies are used.

$$U_{molly}^{slow}(X) = U^{slow}(A(X)). \tag{17}$$

The following sections referred to mollified potential energies but the skilled reader will appreciate that corresponding expressions apply for systems where mollification is not used, mutatis mutandis.

Given an integer p>1 such that the outer time-step $\Delta t$ and the inner time-step $\delta t$ satisfy $\Delta t = p\delta t$, the mollified impulse MTS method of Izaguirre et al., 1999 is now given by $$M\frac{d^2}{dt^2}X(t) = \tag{18}$$

$$\sum_{m=0}^{L} c_m \Delta t \delta_x(t - m\Delta t) F_{molly}^{slow}(X(t)) + \sum_{n=0}^{pL} d_n \delta t \delta_x(t - n\delta t) F^{fast}(X(t)),$$

for $t \in [0, t'=L\Delta t]$ with the slow forces defined by $$F_{molly}^{slow}(X) = -\nabla U_{molly}^{slow}(X) = A_X(X)^T F^{slow}(A(X)), \tag{19}$$

where $A_X(X)$ denotes the Jacobian matrix of partial derivatives, $F^{fast}(X) = -\nabla U^{fast}(X)$, and $\delta_x$ denotes the Dirac delta function. The coefficients $c_m$ and $d_n$ are defined by $c_m = d_n = 1$ except when m=n=0 or m=L, n=pL, respectively, in which case $c_m = d_n = \frac{1}{2}$. Appendix A gives a numerical solution for (18).

One notes that (18) can be viewed as a standard impulse MTS method applied to a "mollified" molecular system defined by the energy functional $$H_{molly}(\Gamma) = \frac{1}{2} P^T M^{-1} P + U^{fast}(X) + U_{molly}^{slow}(X). \tag{19B}$$

We now describe the homogeneous extension of the mollified MTS methods (18). As already discussed, we introduce an additional variable b and the extended mollified MTS methods can be expressed compactly as follows:

$$M\frac{d^2}{dt^2}X(t) = \tag{20}$$

$$\sum_{m=0}^{L} c_m \Delta t \delta_x(t - m\Delta t) F_{molly}^{slow}(X(t)) + \sum_{n=0}^{pL} d_n \delta t \delta_x(t - n\delta t) F^{fast}(X(t)),$$

$$\frac{d}{dt} b(t) = -\sum_{m=0}^{L} c_m \Delta t \delta_x(t - m\Delta t) [X(t)^T F_{molly}^{slow}(X(t)) + 2U_{molly}^{slow}(X(t))] - \tag{21}$$

$$\sum_{n=0}^{pL} d_n \delta t \delta_x(t - n\delta t) [X(t)^T F^{fast}(X(t)) + 2U^{fast}(X(t))]$$

Note that (20) is identical to (18) and that (18) can be integrated exactly.

(21) can also be integrated exactly once X(t) has been determined from (20). Hence (20)-(21) define a one-step method in $Y = (X^T, 1, P^T, b)^T$, which we denote by $$Y_{i+1} = \hat{\Psi}_{L\Delta t}(Y_i). \tag{22}$$

Finally note that (21) corresponds to (8).

We next describe the computation of shadow Hamiltonians for MTS methods using the extended time-stepping method (22).

Skeel & Hardy Construction of 4th and 8th Order Shadow Hamiltonians

Once an appropriate extension of a symplectic time-stepping method has been formulated, Skeel and Hardy, 2001 provide a straightforward approach for evaluating higher-order shadow Hamiltonians. Here we only summarize the final formulas for fourth and eighth order shadow Hamiltonians.

Assume that we wish to determine the value of the shadow Hamiltonian about $Y_i = (X_i^T, 1, P_i^T, b_i)^T$. Then k=1 (fourth-order) or k=2 (eighth-order) time-steps forward and backward in time are performed with (22) (unless those steps have already been performed as part of the simulation). Hence we have 2k+1 discrete approximations $Y_j$, $j = i-k, \ldots, i, \ldots, i+k$, centered about V, available and, for k=2, we define $$A_0 = Y_i, \tag{23}$$

$$A_1 = \frac{1}{2}(Y_{i+1} - Y_{i-1}), \tag{24}$$

$$A_2 = Y_{i+1} - 2Y_i + Y_{i-1}, \tag{25}$$

$$A_3 = \frac{1}{2}[Y_{i+2} - 2Y_{i+1} + 2Y_{i-1} - Y_{i-2}], \tag{26}$$

$$A = Y_{i+2} - 4Y_{i+1} + 6Y_i - 4Y_{i-1} + Y_{i-2}, \tag{27}$$

as well as $$A_{lm} = \frac{1}{2\Delta t} A_l^T J A_m, \, l, m = 0, \ldots, 4, \tag{28}$$

with the skew-symmetric matrix J defined by (11). In case of k=1 we need only to compute $A_0$, $A_1$, $A_2$ and $A_{lm}$ for m, l= 0, ..., 2.

The fourth-order shadow Hamiltonian at $Y_i$ is now defined by $$H_{\Delta t}^{[4],MTS}(X_i, P_i) = A_{10} - \frac{1}{6} A_{12} \tag{29}$$

and the eighth-order shadow Hamiltonian by $$H_{\Delta t}^{[8],MTS}(X_i, P_i) = \tag{30}$$

$$A_{10} - \frac{2}{7} A_{12} + \frac{5}{42} A_{30} + \frac{13}{105} A_{32} - \frac{19}{210} A_{14} - \frac{1}{140} A_{34},$$

respectively.

Shadow Hamiltonians for the MTS-GSHMC Method According to Preferred Embodiments

Skeel and Hardy, 2001 use the homogeneous embedding approach to develop shadow Hamiltonians for the Störmer-Verlet method and these shadow Hamiltonians have been implemented in the shadow hybrid Monte Carlo (SHMC) method of Izaguirre and Hampton, 2004.

An initial application of (29) to an MTS method with Monte Carlo methodology such as the MTS-GHMC method in the co-pending application led however, to an unsatisfactory behavior of the resulting shadow MTS-GSHMC method. While the acceptance rate in the MDMC part increased as expected, a large drift in kinetic energy was observed in the course of the Monte Carlo simulation. An explanation for this phenomenon is that the shadow Hamiltonian $H_{\Delta t}^{[4],MTS}$ is nearly conserved along numerical trajectories under the MDMC step but, at the same time, it is found that the difference between the original Hamiltonian H and the shadow Hamiltonian $H_{\Delta t}^{[4],MTS}$ becomes large as momenta P get refreshed under the PMMC part of the MTS-GSHMC method.

To overcome this large drift in the shadow Hamiltonian $H_{\Delta t}^{[4],MTS}$, the inventors investigated an alternative derivation of shadow Hamiltonians from the standard BCH-formula for splitting methods (Hairer et al., 2002; Leimkuhler and Reich, 2005). The associated fourth-order shadow Hamiltonian is given by $$H_{\Delta t}^{[4]} = H - \frac{\delta t^2}{24}\left[(F^{fast})^T M^{-1} F^{fast} - 2P^T M^{-1} U_{xx}^{fast} M^{-1} P\right] - \qquad (31)$$
$$\frac{\Delta t^2}{24}\left[(F_{molly}^{slow} + 2F^{fast})^T M^{-1} F_{molly}^{slow} - 2P^T M^{-1} (U_{molly}^{slow})_{XX} M^{-1}\right] +$$
$$O(\delta t^4, \Delta t^4).$$

Here $U_{XX}$ denotes the Hessian matrix of second-order partial derivatives of a scalar-valued function U. We note that (31) is the sum of the original Hamiltonian plus the corrections from a Störmer-Verlet method applied to the fast and slow systems alone plus a mixed term $$-\frac{\Delta t^2}{12}(F^{fast})^T M^{-1} F_{molly}^{slow}.$$

Next we write (31) in the equivalent form (up to higher order terms in $\delta t$ and $\Delta t$)

$$H_{\Delta t}^{[4]} = H_{\delta t}^{[4],SV,fast} + H_{\Delta t}^{[4],SV,slow} - \frac{1}{2}P^T M^{-1} P - \frac{\Delta t^2}{12}(F^{fast})^T M^{-1} F_{molly}^{slow}. \qquad (32)$$

Here $H_{\delta t}^{[4],SV,fast}$ denotes a fourth-order shadow Hamiltonian for a Störmer-Verlet integration of the fast system with Hamiltonian $H^{fast}=P^T M^{-1}P/2+V^{fast}(X)$ and step-size $\delta t$. Similarly, $H_{\Delta t}^{[4],SV,slow}$ denotes a fourth-order shadow Hamiltonian for a Störmer-Verlet integration of the slow system with Hamiltonian $H^{slow}=P^T M^{-1}P/2+V_{molly}^{slow}(X)$ and step-size $\Delta t$. Explicit formulas for $H_{\delta t}^{[4],SV,fast}$ and $H_{\Delta t}^{[4],SV,slow}$ can be found in Appendix B and follow from the results stated in Skeel and Hardy, 2001 for the standard Störmer-Verlet method. Alternatively, one could use the shadow Hamiltonians proposed in Akhmatskaya and Reich, 2008.

We further note that $$H_{\Delta t}^{[4],SV,slow} - \frac{1}{2}P^T M^{-1} P - \frac{\Delta t^2}{12}(F^{fast})^T M^{-1} F_{molly}^{slow} H_{\Delta t}^{[4],MTS} - H_{\Delta t}^{[4],MTS,fast} + O(\delta t^4, \Delta t^4), \qquad (33)$$

where $H_{\Delta t}^{[4],MTS,fast}$ denotes the fourth-order shadow Hamiltonian (29) for the MTS method (18) with $F_{molly}^{slow}\equiv 0$. Hence, we finally propose the following fourth-order shadow Hamiltonian $$H_{\Delta t}^{[4]} = H_{\Delta t}^{[4],MTS} - H_{\Delta t}^{[4],MTS,fast} + H_{\delta t}^{[4],SV,fast}. \qquad (34)$$

We used this shadow Hamiltonian in the numerical experiments provided later. The key observation is that (34) contains approximations on both time-step levels (outer and inner) while (29) relies on the outer time-step $\Delta t$ only.

We now generalize (34) to arbitrary order. Let $H_{\Delta t}^{[q],MTS}$ denote the q th order shadow Hamiltonian for a MTS method according to the construction of Skeel and Hardy, 2001. Let $H_{\Delta t}^{[q],MTS,fast}$ denote the q th order shadow Hamiltonian for the same MTS method with $F_{molly}^{slow}$ set equal to zero. Finally, let $H_{\delta t}^{[q],SV,fast}$ denote the q th order shadow Hamiltonian for the Störmer-Verlet method applied to the fast system with step-size $\delta t$. Then we propose the following shadow Hamiltonian for use in the newly proposed MTS-GSHMC method:

$$H_{\Delta t}^{[q]} = H_{\Delta t}^{[q],MTS} - H_{\Delta t}^{[q],MTS,fast} + H_{\delta t}^{[q],SV,fast}. \qquad (35)$$

Multiple-Time-Stepping Generalized Shadow Hybrid Monte Carlo (MTS-GSHMC) Method

Embodiments of the simulation method take the hybrid Monte Carlo (GHMC) method (Kennedy and Pendleton, 2001; Horowitz, 1991) and its extension to shadow Hamiltonians by Akhmatskaya and Reich, 2008 as a starting point. It has furthermore been demonstrated (Akhmatskaya et al., 2009) that the generalized shadow hybrid Monte Carlo (GSHMC) method can be implemented without a momentum flip upon rejection of the molecular dynamics proposal step.

We now demonstrate how to combine GSHMC with a mollified MTS method. To do so, we assume that a splitting of the potential energy function U into a fast contribution $U^{fast}$ and a slow contribution $U^{slow}$ is given. We also assume that an averaging operator (16) has been defined, which implies a mollified slow potential (17). We also assume that an extended mollified MTS method (22) as well as a shadow Hamiltonian (35) of order $q \geq 4$ has been implemented. For simplicity of notation, we denote this shadow Hamiltonian by $H_{\Delta t}$.

MTS-GSHMC: Algorithmic Summary of One Embodiment

The generalized shadow hybrid Monte Carlo (GSHMC) algorithm of Akhmatskaya and Reich, 2008 and Akhmatskaya et al., 2009 for sampling with respect to the shadow canonical distribution $$\tilde{\rho}_{canon} \propto \exp(-\beta H_{\Delta t}) \qquad (36)$$

is defined as the concatenation of two MCMC steps: a molecular dynamics Monte Carlo (MDMC) and a partial momentum refreshment Monte Carlo (PMMC) step. Two key novel steps of the proposed MTS-GSHMC method are the implementation of an extended mollified impulse MTS method (20)-(21) and importance sampling with respect to a shadow Hamiltonian $H_{\Delta t}$. We now summarize the proposed MTS-GSHMC method.

The accepted states of the MTS-GSHMC method are denoted by $\Omega_i=(Y_i^T,t_i)^T$, $i=0,\ldots,I$, where I is a given integer, $Y_i=(X_i^T,1,P_i^T,b_i)^T$, $X_i$ is a collective vector of atomic positions, $P_i$ is a collective vector of atomic momenta, $b_i$ is a scalar, and $t_i$ is time. Note that the definition of $\Omega_i$ is different from the one used for the MTS-GHMC method in the co-pending application.

Partial Momentum Refreshment Monte Carlo (PMMC)

The PMMC step of MTS-GSHMC consists of a proposal step and a Metropolis accept/reject criterion.

Partial momentum refreshment (PM). Given an accepted state $\Omega_i=(Y_i^T,t_i)^T$, $Y_i=(X_i^T,1,P_i^T,b_i)^T$, its collective atomic momentum vector $P_i$ is mixed with an independent and identically distributed normal (Gaussian) noise vector $\Xi$, of dimension 3N and the partial momentum refreshment step is given by $$\tilde{P}=\cos(\phi)P_i+\sin(\phi)\Xi_i,$$

$$\tilde{\Xi}_i=\cos(\phi)\Xi_i-\sin(\phi)P_i, \qquad (37)$$

where $0<\phi\leq\pi/2$ is a given angle and $\Xi_i \sim N[0,\beta M^{-1}]$. Here $N[0,\beta M^{-1}]$ denotes the (3N)-dimensional normal distribution with zero mean and covariance matrix $\beta M^{-1}$, M is the diagonal mass matrix of the molecular system, $\beta=1/k_BT$ is the inverse temperature and $H_{\Delta t}$ is the shadow Hamiltonian. Denote the proposed state vector by $\tilde{\Omega}_i=(\tilde{Y}_i^T,t_i)^T$, $\tilde{Y}_i=(X_i^T,1,\tilde{P}_i^T,b_i)^T$.

Monte Carlo (MC). The accepted state $\overline{\Omega}_i$ is found through a Metropolis accept/reject criterion:

$$\overline{\Omega}_i = \begin{cases} \tilde{\Omega}_i & \text{with probability min}(1, \exp(-\beta\Delta H^e_{\Delta t})) \\ \Omega_i & \text{otherwise,} \end{cases} \quad (38)$$

with $$\Delta H^e_{\Delta t} := H_{\Delta t}(\tilde{X}_i, \tilde{P}_i) + \frac{1}{2}\tilde{\Xi}_i^T M^{-1}\tilde{\Xi}_i - H_{\Delta t}(X_i, P_i) - \frac{1}{2}\Xi_i^T M^{-1}\Xi_i. \quad (39)$$

Molecular Dynamics Monte Carlo (MDMC)

This step consists of the following two sub-steps.

Molecular dynamics (MD). We apply the extended mollified MTS method (22) to the current state $\overline{\Omega}^+_i=(\overline{Y}_i^T,t_i)^T$ with $\overline{Y}_i=(X_i^T,1,\overline{P}_i^T,b_i)^T$. The proposal state is defined by $$\hat{\Omega}_i=(\hat{Y}^T,t_i+L\Delta t)^T, \text{ with } \hat{Y}_i=\hat{\Psi}_\tau(\overline{Y}_i) \quad (40)$$

for $\tau=\Delta tL$ and given integer $L\geq 1$. Let us also introduce $\overline{\Omega}^-_i=(\overline{Y}^-_i,t_i)^T$, $\overline{Y}^-_i=(X_i^T,1,-\overline{P}_i^T,b_i)^T$.

Monte Carlo (MC): The next accepted state $\Omega_{i+1}$ is found through a Metropolis accept/reject criterion $$\Omega_{i+1} = \begin{cases} \hat{\Omega}_i & \text{with probability min}(1, \exp(-\beta\Delta H_{\Delta t})) \\ \overline{\Omega}^{\pm}_i & \text{otherwise,} \end{cases} \quad (41)$$

with $$\Delta H_{\Delta t} := H_{\Delta t}(\hat{X}_i, \hat{P}_i) - H_{\Delta t}(X_i, \overline{P}_i). \quad (42)$$

Depending on the implementation—either without flip or with flip—$\overline{\Omega}^+_i$ or $\overline{\Omega}^-_i$ are used in (41) respectively.

Remarks

We wish to point out that the collective vector of atomic positions $X_i$ as well as time $t_i$ remain unchanged from $\Omega_i$ to $\Omega_{i+1}$, in case of rejection of the MDMC proposal step.

The free parameters of the MTS-GSHMC scheme include the angle $\phi$ in (37), the inner and outer step-sizes $\delta t$ and $\Delta t$, respectively, as well as the number of outer time-steps L and the order of the shadow Hamiltonian. We will always assume that $$\phi=\sqrt{2\gamma\tau}\ll 1. \quad (43)$$

Here $\gamma>0$ is the collision frequency of an underlying Langevin model (Akhmatskaya et al., 2009; and see co-pending application) and $\tau=\Delta tL$. Throughout, we will use L=1.

Note that the variable b is only required for computing shadow Hamiltonians. Furthermore, only differences in b appear in the formulas for shadow Hamiltonians and, hence, one can set b=0 at the beginning of each MDMC and PMMC step.

Data Analysis

Let $\{\Omega_i\}_{i=1}^I$ denote a sequence of accepted states from a MTS-GSHMC simulation with $\Omega_i=(Y_i^T,t_i)^T$ and $Y_i=(X_i^T,1,P_i^T,b_i)^T$. Expectation values of a function $f(\Gamma)$, $\Gamma=(X^T,P^T)^T$, with respect to the canonical density $$\rho_{canon}\propto\exp(-\beta H) \quad (44)$$

are computed according to the formula $$\langle f\rangle = \frac{\sum_{i=1}^I w_i f(\Gamma_i)}{\sum_{i=1}^I w_i} \quad (45)$$

with weight factors $$w_i=\exp(-\beta(H(X_i,P_i)-H_{\Delta t}(X_i,P_i))) \quad (46)$$

and state variables $\Gamma_i=(X_i^T,P_i^T)^T$. Provided the MTS-GSHMC method generates an ergodic Markov chain for the given molecular system, we have $$\lim_{I\to\infty}\langle f\rangle = E[f] \quad (47)$$

independent of the specific parameter values of the implemented MTS-GSHMC method (Liu, 2001).

In our numerical experiments we will compute expectation values for kinetic and total energy as well as velocity autocorrelation functions (ACF). See Reich and Akhmatskaya, 2009 for details on the evaluation of ACFs.

In the co-pending application, we introduce the effective outer-step size $$\Delta t_{eff}=\Delta t\times(\text{acceptance rate (AR) of MDMC}/100), \quad (48)$$

of a MTS-GHMC method as a measure for efficiency. The efficiency gain is then defined as the ratio of $\Delta t_{eff}$ to the largest achievable outer-step size for MTS-LD. Using this measure, it was found (for the co-pending application) that the efficiency gain of MTS-GHMC over MTS-LD is about 1.4. In this report, we use effective outer time-steps to compare the newly proposed MTS-GSHMC to the MTS-GHMC method of the related art co-pending application.

Model System and Numerical Results

Description of Model System

We consider a one-dimensional chain of diatomic molecules interacting through Lennard-Jones potentials. The details of the model and the simulation parameters are identical to those of the co-pending application.

We now describe the model system in more detail. All quantities are treated as dimensionless. Each particle/atom has mass m=0.5, position $x_i\in[0,l]$ and velocity $v_i\in R$. We assume periodic boundary conditions over a domain of length $l=20$ and set the number of particles to $N=20$ (i.e., we consider 10 diatomic molecules). The potential energy of the system is given by $$U(X) = \frac{K}{2}\sum_{i=1}^{N/2}(|x_{2i-1}-x_{2i}|-1)^2 + 2\sum_{i=1}^N\sum_{j\in n(i)}\left[\left(\frac{\sigma}{|x_i-x_j|}\right)^{12}-\left(\frac{\sigma}{|x_i-x_j|}\right)^6\right], \quad (48A)$$

where n(i) contains the indices of the (N−3) nearest non-bonded neighbors of particle i, $\sigma^6=\frac{1}{2}$, and K=1.5421e+05.

Note that the frequency of the fast diatomic bond vibrations is given by $$\omega=\sqrt{2K/m}\approx 785.3982. \quad (48B)$$

This frequency has been chosen such that the linear stability limit of the standard Störmer-Verlet method is $\Delta t \leq 2/\omega \approx 0.0025$ and the first numerical resonance of the standard MTS method occurs at $\Delta t \approx \pi/\omega = 0.004$ (Izaguirre et al., 1999). Hence our model system qualitatively mimics the stability limits found for MTS methods applied to solvated biomolecular systems (Izaguirre et al., 1999) with one dimensionless time unit corresponding to one picosecond. We will use this (formal) association of dimensionless "model" time with "real" time throughout this section.

Furthermore, the stability limit of the Störmer-Verlet method applied to the Lennard-Jones interactions alone was found numerically to be around $\Delta t = 0.015$ ps. We note that this stability limit is of the same order of magnitude as the achievable outer step-sizes reported by Izaguirre et al., 2001 for Langevin stabilized and mollified MTS methods. It should, however, be kept in mind that the large time-step behavior of biomolecular simulations is much more complex than what our model system can represent.

We perform constant NVT simulations at $\beta = 1/k_B T = 1$ using the proposed embodiment of the MTS-GHMC or MTS-GSHMC method implemented without momentum flip and compare the results to Langevin stabilized MTS simulations (MTS-LD). Following Izaguirre et al., 2001, the collision frequency is $\gamma = 0.2$ ps$^{-1}$ in all cases. The slow and fast potential energy contributions are defined by the stiff bonded interactions and the Lennard-Jones interactions, respectively. We monitor the mean kinetic and total energies as well as the velocity ACF for the center of mass motion of the diatomic molecules. In case of MTS-GHMC or MTS-GHSMC we also collect the acceptance rates (AR) in the Metropolis accept/reject criterion.

Numerical Results

We first tested the MTS-GHMC method of the co-pending application for inner step-sizes larger than those reported in that application and found that $\delta t$ can be increased to $\delta t = 0.5$ fs (as opposed to $\delta t = 0.25$ fs used in Reich and Akhmatskaya, 2009). A further increase resulted in the inner step-size led to dramatically reduced acceptance rates in the MDMC part of MTS-GHMC. However, the MTS-LD implementation of Izaguirre et al., 2001 gave satisfactory results for $\delta t = 1$ fs (but not for $\delta t = 2$ fs) and we conclude that the MTS-GSHMC method should be able to use $\delta t = 1$ fs as the inner step-size. The specific results can be found in Table 1.

TABLE 1

| Method | $\delta t$ | $\Delta t$ | numerical \<H\> | numerical temperature | AR MDMC |
|---|---|---|---|---|---|
| MTS-GHMC | 0.25 fs | 10 fs | 29.1690 | 1.0045 | 96% |
| MTS-GHMC | 0.25 fs | 16 fs | 29.6510 | 1.0097 | 85% |
| MTS-LD | 0.25 fs | 10 fs | 29.3044 | 1.0041 | NA |
| MTS-GHMC | 0.5 fs | 10 fs | 28.8384 | 1.0058 | 89% |
| MTS-GHMC | 0.5 fs | 16 fs | 30.1134 | 1.0133 | 85% |
| MTS-LD | 0.5 fs | 10 fs | 29.0486 | 0.9886 | NA |
| MTS-GHMC | 1 fs | 10 fs | 27.5779 | 1.0043 | 60% |
| MTS-GHMC | 1 fs | 16 fs | 30.5763 | 1.0016 | 76% |
| MTS-LD | 1 fs | 10 fs | 30.7494 | 0.9957 | NA |

In Table 1 we state averages of total energy, computed temperatures (from the mean kinetic energy) and Metropolis acceptance rates (AR) for the MTS-GHMC method as a function of the inner and outer time-steps. The target temperature is T=1 and a reference simulation gave an averaged total energy of $\langle H \rangle = 29.4121$ (Reich and Akhmatskaya, 2009). We conclude that an inner time-step of $\delta t = 1$ fs leads to a much reduced acceptance rate, while the results for $\delta t = 0.5$ fs are acceptable. We also note that the errors in the computed values for $\langle H \rangle$ are above the 5% threshold for the MTS-GHMC simulation with $\delta t = 1$ fs and $\Delta t = 10$ fs (printed in bold). For comparison, we also present results from Langevin stabilized and mollified MTS simulations (MTS-LD) and find that all reported outer and inner step-sizes lead to an acceptable accuracy. We also conducted simulations with an inner step-size of $\delta t = 2$ fs, which led to large errors (i.e., significantly above the 5% threshold) in the computed temperature as well as total energy for both MTS-GHMC and MTS-LD.

We implemented the newly proposed MTS-GSHMC method without momentum flip with shadow Hamiltonian (34), $\delta t = 1$ fs, $L = 1$, $\phi = \sqrt{2\gamma \Delta t}$, $\gamma = 0.2$ ps$^{-1}$, and outer step-sizes ranging from $\Delta t = 10$ fs to $\Delta t = 22$ fs. The number of Monte Carlo samples I is given by the closest integer to $10000/\Delta t$ so that each simulation covers approximately the same "MD time-span" of 10 microseconds.

The simulation results can be found in Table 2. In Table 2 we provide averages of total energy and computed temperatures (from the mean kinetic energy) for MTS-GSHMC with fourth-order modified energy (34) as a function of the outer time-step $\Delta t$. The inner time-step is $\delta t = 1$ fs for all simulations. We also report Metropolis acceptance rates (AR) in the PMMC and MDMD parts of MTS-GSHMC. The target temperature is T=1 and the reference simulation LD gave an averaged total energy of $\langle H \rangle = 29.4121$. Simulations with an outer step-size larger than 20 fs lead to numerical instabilities.

Simulations with an outer time-step of $\Delta t = 22$ fs are not reported as they led to extremely long sequences of rejected steps, i.e., the acceptance rate in the MDMC part of MTS-GSHMC became very small (below 50%). An assessment of the dynamic properties of the results can be made from FIG. 4. We note that the ACFs of the diatomic center of mass velocities are very similar to those reported in Reich and Akhmatskaya, 2009 for the same simulation settings.

We find that MTS-GSHMC allows for the same outer step-sizes as MTS-GHMC while at the same time significantly increasing the acceptance rates in the MDMC part. Based on effective outer step-sizes (48), this implies an effective efficiency gain which we record in Table 3. Our results suggest that MTS-GSHMC is about 1.4 times more effective than MTS-GHMC and about 1.9 times more effective than the MTS-LD method of Izaguirre et al., 2001.

TABLE 2

| Method | $\Delta t$ | numerical \<H\> | numerical temperature | AR PMMC | AR MDMC |
|---|---|---|---|---|---|
| MTS-GSHMC | 10 fs | 28.0218 | 0.9948 | 98.5% | 99.9% |
| MTS-GSHMC | 12 fs | 28.5266 | 1.0086 | 98.4% | 99.7% |
| MTS-GSHMC | 14 fs | 29.2522 | 1.0259 | 98.2% | 99.1% |
| MTS-GSHMC | 16 fs | 28.0826 | 0.9974 | 98.0% | 98.3% |
| MTS-GSHMC | 18 fs | 28.2329 | 0.9965 | 97.8% | 97.3% |
| MTS-GSHMC | 20 fs | 28.5648 | 1.0178 | 97.6% | 96.0% |

Figure 4:
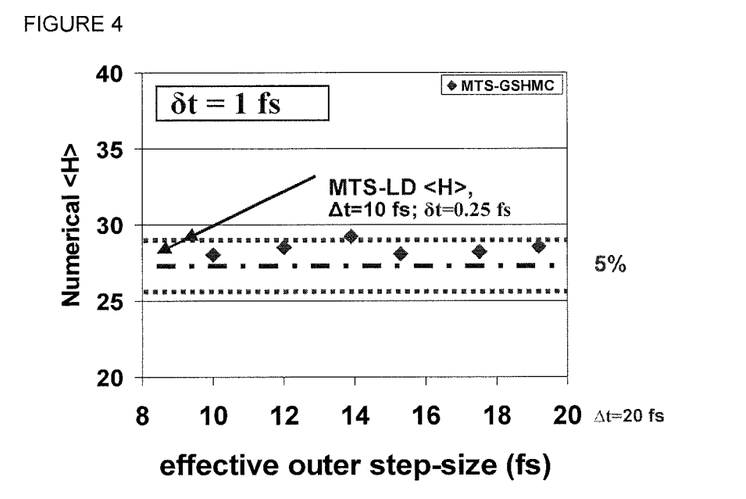
FIG. 4 is a graph of numerical H against effective outer step size for MTS-LD and MTS-GSHMC.

FIG. 4 shows the largest achievable outer step size in graphical form. The largest achievable outer step-size for MTS-GSHMC is 20 fs (against 10 fs for MTS-LD) which corresponds to effective step-size of 19.2 fs. Both MTS-LD and MTS-GSHMC allow for inner step-size $\delta t$ of up to 1 fs. MTS-GHMC reproduces the mean energy and temperatures within 5% of the reference values for outer step-sizes of up to 20 fs.

In Table 3, we indicate effective outer step-sizes for MTS-GSHMC and MTS-GHMC. We find that MTS-GSHMC increases the effective outer-step sizes of MTS-GHMC by a factor of about 1.4. The increase compared to MTS-LD is about 1.9.

TABLE 3

| $\Delta t$ | Method | $\Delta t_{\text{eff}}$ | Method | $\Delta t_{\text{eff}}$ |
|---|---|---|---|---|
| 10 fs | MTS-GSHMC | 10.0 fs | MTS-GHMC | 9.6 fs |
| 12 fs | MTS-GSHMC | 12.0 fs | MTS-GHMC | 11.4 fs |
| 14 fs | MTS-GSHMC | 13.9 fs | MTS-GHMC | 12.6 fs |
| 16 fs | MTS-GSHMC | 15.3 fs | MTS-GHMC | 13.6 fs |
| 18 fs | MTS-GSHMC | 17.5 fs | MTS-GHMC | 13.7 fs |
| 20 fs | MTS-GSHMC | 19.2 fs | MTS-GHMC | 13.2 fs |

Figure 5:
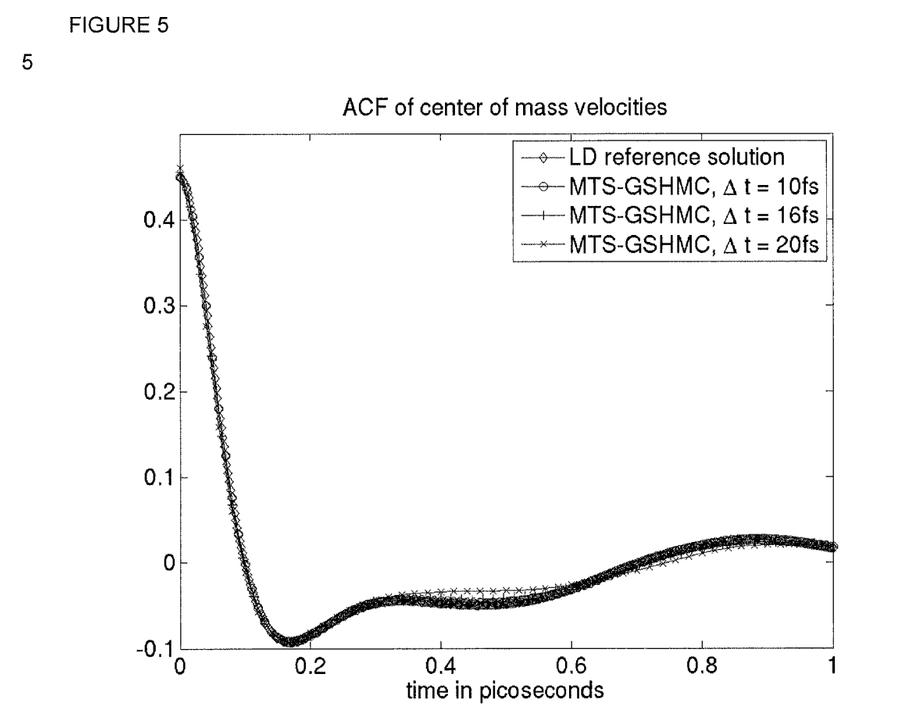
FIG. 5 is a graph of the autocorrelation functions of diatomic centre of mass velocities for MTS-GSHMC as a function of the outer time-step $\Delta t$.

FIG. 5 shows the autocorrelation functions (ACFs) of diatomic center of mass velocities for MTS-GSHMC as a function of the outer time-step $\Delta t$. Given the fact that we cover a relatively large range of time-steps beyond the stability limit of MTS-LD, the computed ACFs agree remarkably well. The corresponding ACF from the small time-step reference simulation LD are also provided for comparison.

Here we summarize the main findings from our numerical experiments relating to specific embodiments.

Shadow Hamiltonians: We found that a straightforward application of the shadow Hamiltonian formulations of Skeel and Hardy, 2001 to MTS methods leads to a large drift in energy values along MC samples. An improved formulation (34) was developed and successfully implemented for the test system of the co-pending application, MTS-GHMC.

Efficiency gains: Compared to MTS-GHMC, the novel MTS-GSHMC method allows an increase in the inner time-step $\delta t$ by a factor of 2 and the effective outer-step (48) could be increased by a factor of 1.4 while not reducing the accuracy of the simulation results. Compared to MTS-LD (Izaguirre et al., 2001), the effective outer time-step could be increased by a factor of nearly 2.

Accuracy and Stability: Both MTS-GHMC and MTS-GSHMC run at comparable accuracy. It appears that MTS-GSHMC becomes more vulnerable to long sequences of rejections as $\Delta t$ increases beyond 20 fs. However, it is also observed that both MTS-GHMC and MTS-GSHMC require outer step-sizes of $\Delta t \leq 20$ fs to accurately reproduce velocity ACFs. Hence, outer step-sizes larger than 20 fs are only of interest in the context of pure sampling (which is not considered in this report and for which alternative methods are available such as MTS-GSHMC with momentum flips (Akhmatskaya et al., 2009; and see co-pending application).

There are some limitations of our model system compared to biomolecular simulations that need be pointed out clearly. In particular, numerical evidence suggests that the achievable outer step size of mollified MTS methods is limited by resonance instabilities at about 8 fs for explicit water simulations (Izaguirre et al., 1999). Additional resonance instabilities are found for even larger outer step-sizes (Izaguirre et al., 2001). These instabilities can be masked by using Langevin dynamics with increasingly large values of the collision frequencies $\gamma$ (Izaguirre et al., 2001). On the other hand, the achievable outer step-size for our model system is limited by the stability of Störmer-Verlet with respect to Lennard-Jones interactions. This instability cannot be overcome by Langevin dynamics even with increasingly large values of $\gamma$. This (non-resonance) stability barrier also limits the possible efficiency gains for MTS-GSHMC and we expect larger possible increases of outer-step sizes for simulations of biomolecular systems. Finally, note that short range contributions of the Lennard-Jones interactions have been treated as part of the fast forces in Izaguirre et al. (1999, 2001) which again points towards larger achievable outer time-steps for MTS-GSHMC in biomolecular applications.

APPENDIX A

Impulse Time-Stepping Methods

In this appendix, we outline how (18) can be solved exactly to give rise to a numerical approximation for the differential equation $$M \frac{d^2}{dt^2} X = -\nabla U^{fast}(X) - \nabla U^{slow}_{molly}(X). \tag{49}$$

We note that equation (49) is conservative with energy (19B)

We recall that the ratio between the inner time-step $\delta t$ and the outer time-step $\Delta t$ is denoted by $p=\Delta t/\delta t$ and $L$ is the number of outer time-steps. We introduce the notation $P(t'+\epsilon)$ and $P(t'-\epsilon)$ to denote the left and right hand side, respectively, limits of a time-dependent collective atomic momentum vector $P(t)$ with a discontinuity at $t=t'$. We also introduce $t_n=n\delta t$, $n=0, \ldots, pL$.

Integration of (20) once with respect to time reveals that $P(t)$=const. whenever $t \neq t_n$, which implies $$X(t_{n+1})=X(t_n)+\delta t M^{-1} P(t_n+\epsilon), P(t_{n+1}-\epsilon)=P(t_n+\epsilon). \tag{50}$$

For all $t=t_n$, $n=0, \ldots, pL$, an "impulse/kick" is applied to the velocities while the positions remain constant, i.e., $X(t_n+\epsilon)=X(t_n-\epsilon)=X(t_n)$ since $X(t)$ is continuous. The magnitude of the impulse/kick depends on whether there is an integer $m$, $m=0, \ldots, L$, such that $n=mp$ (outer time-step) or not (inner time-step). In case of an outer time-step we have $$P(t_n+\epsilon)=P(t_n-\epsilon)+c_m \Delta t F_{molly}^{slow}(X(t_n))+d_n \delta t F^{fast}(X(t_n)), (n=pm) \tag{51}$$

while an inner time-step leads to $$P(t_n+\epsilon)=P(t_n-\epsilon)+d_n \delta t F^{fast}(X(t_n)). \tag{52}$$

The constant coefficients $c_n$ and $d_m$ take values as defined for (18).

Given an initial molecular state $\Gamma(0)$, we formally set $P(-\epsilon)=P(0)$ to initiate the algorithm. Similarly, at final time $\tau=\Delta t L$, we formally set $P(\tau)=P(\tau+\epsilon)$ to define the molecular state vector $\Gamma(\tau)$ at $t=\tau$. Hence we have constructed a mapping $\Psi_\tau: \Gamma(0) \to \Gamma(\tau)$ which maps an initial molecular state $\Gamma(0)$ into the desired numerical approximation $\Gamma(\tau)$ at time $\tau=L\Delta t=pL\delta t$. The mapping $\Psi_\tau$ is time-reversible, symplectic and volume conserving (Izaguirre et al., 1999).

APPENDIX B

The fourth-order shadow Hamiltonian of Skeel and Hardy, 2001 for the Störmer-Verlet method applied to a system with Hamiltonian $$H(X, P) = \frac{1}{2} P^T M^{-1} P + U(X) \tag{53}$$

and step-size h is given by $$H_h^{[4],SV}(X_i, P_i) = H(X_i, P_i) + \frac{1}{4}[U(X_{i+1}) - 2U(X_i) + U(X_{i-1})] + \qquad (54)$$

$$\frac{h}{12} P_i^T M^{-1} [F(X_{i+1}) - F(X_{i-1})] + \frac{5h^2}{24} F(X_i)^T M^{-1} F(X_i) +$$

$$\frac{h^2}{12} F(X_i)^T M^{-1} [F(X_{i+1}) - 2F(X_i) + F(X_{i-1})],$$

with $F = -\nabla U$. We obtain $H_{\delta t}^{[4],SV,fast}$ by setting $h=\delta t$, $U=U^{fast}$ and $F=F^{fast}$ and $H_{\Delta t}^{[4],SV,slow}$ by setting $h=\Delta t$, $U=U_{molly}^{slow}$ and $F=F_{molly}^{slow}$, respectively. Alternatively, one could use the fourth-order shadow Hamiltonian proposed in Akhmatskaya and Reich, 2008 for the Störmer-Verlet method.

The invention claimed is:

1. A computer-implemented method of simulating behaviour of a thermodynamic system over time, the thermodynamic system having potential energy that can be split into more quickly varying parts and more slowly varying parts and having a state described by collective vectors of position and momentum at any given time, the method comprising:
    a momentum refreshment process and a conservative dynamics process performed by a processor, wherein
    the momentum refreshment process comprises carrying out an operation of mixing the collective momentum vector with a noise vector and carrying out an acceptance and rejection operation;
    the conservative dynamics process comprises applying a multiple time stepping conservative dynamics operation to a current state, in which operation calculations for forces corresponding to more slowly varying energy parts in the thermodynamic system undergo an averaging procedure and are carried out at a larger time step than calculations for forces corresponding to more quickly varying energy parts; and carrying out an acceptance and rejection operation; wherein
    the acceptance and rejection operations are based on an approximation of the system energy expressed using shadow Hamiltonians and comprise accepting a current state or returning a replacement state,
    wherein the states in the method are denoted by $\Omega_i=(Y_i^T, t_i)^T$, $i=0, \ldots, I$, where I is a given integer, $Y_i=(X_i^T,1,P_i^T,b_i)^T$, $X_i$ is a collective vector of atomic positions, $P_i$ is a collective vector of atomic momenta, $b_i$ is a scalar, and $t_i$ is time and wherein the mixing operation comprises: given a current state, mixing its collective atomic momentum vector $P_i$ with an independent and identically distributed normal noise vector $\Xi_i$ of dimension 3N, so that $$\tilde{P}_i = \cos(\phi)P_i + \sin(\phi)\Xi_i,$$

$$\tilde{\Xi}_i = \cos(\phi)\Xi_i - \sin(\phi)P_i,$$

where i is a given integer, N is the number of particles in the system, $0 < \phi \leq \pi/2$ is a given angle, $\Xi_i \sim N[0,\beta M^{-1}]$, $N[0,\beta M^{-1}]$ denotes the (3N)-dimensional normal distribution with zero mean and covariance matrix $\beta M^{-1}$, M is the diagonal mass matrix of the molecular system, and $\beta=1/k_B T$ is the inverse temperature, proposed vector being denoted by $\tilde{\Omega}_i=(\tilde{Y}_i^T, t_i)^T$, $\tilde{Y}_i=(X_i^T,1,\tilde{P}_i^T,b_i)^T$; and preferably wherein the subsequent acceptance/rejection operation comprises obtaining the resulting state $\overline{\Omega}_i$; through a Metropolis accept/reject criterion:

$$\overline{\Omega}_i = \begin{cases} \tilde{\Omega}_i & \text{with probability } \min(1, \exp(-\beta \Delta H_{\Delta t}^e)) \\ \Omega_i & \text{otherwise,} \end{cases}$$

with $$\Delta H_{\Delta t}^e := H_{\Delta t}(X_i, \tilde{P}_i) + \frac{1}{2}\tilde{\Xi}_i^T M^{-1} \tilde{\Xi}_i - H_{\Delta t}(X_i, P_i) - \frac{1}{2}\Xi_i^T M^{-1} \Xi_i,$$

in which $H_{\Delta t}$ is the shadow Hamiltonian and $\Delta H_{\Delta t}^e$ is the change in shadow Hamiltonian due to the mixing operation.

2. A method according to claim 1, wherein the conservative dynamics process uses a mollified impulse method, in which an averaging operator A is applied to a collective position vector X and derives mollified more slowly varying potential energy $U_{molly}^{slow}$ related to more slowly varying potential energy, yielding mollified forces $F_{molly}^{slow}$, and preferably wherein calculated properties are re-weighted at the end of the entire method, to allow for the use of mollified terms and shadow Hamiltonians.

3. A method according to claim 2, wherein the mollified multiple time stepping method applies the operator A to the collective position vector X and derives the mollified potential energy $U_{molly}^{slow}$ related to more slowly varying potential energy, yielding mollified more slowly varying forces $F_{molly}^{slow}$, wherein:

$$M \frac{d^2}{dt^2} X(t) = \sum_{m=0}^{L} c_m \Delta t \delta_x (t - m\Delta t) F_{molly}^{slow}(X(t)) + \sum_{n=0}^{pL} d_n \delta t \delta_x (t - n\delta t) F^{fast}(X(t)),$$

for $t \in [0, t'=L\Delta t]$ with the slow forces defined by $$F_{molly}^{slow}(X) = -\nabla U_{molly}^{slow}(X) = A_X(X)^T F^{slow}(A(X)),$$

where M is a diagonal mass matrix of atomic masses, $A_X(X)$ denotes the Jacobian matrix of partial derivatives, the larger time-step for more slowly varying forces $F^{slow}$ is $\Delta t$, the smaller time-step for more quickly varying forces is $\delta t_F$, $\delta fast_x$ the Dirac delta function, $c_m = d_n = 1$ except when $m=n=0$ or $m=L$, $n=pL$, respectively, in which case $c_m = d_n = \frac{1}{2}$, integer $p > 1$, and $L > 0$ is a given integer.

4. A method according to claim 1, wherein either the momentum refreshment or the conservative dynamics process is the first process of the method, and the resulting state of any process in the method provides the current state for the next process in the method.

5. A method according to claim 1, wherein the acceptance and rejection operation following the mixing operation returns the resulting state of the mixing operation in the case of acceptance and the state before the mixing operation as the replacement state in a case of rejection; and wherein
    the acceptance and rejection operation following the conservative dynamics operation returns the resulting state of the conservative dynamics operation in the case of acceptance; and, in the case of rejection, the state before the conservative dynamics operation is either returned as the replacement state or undergoes a momentum flip to provide the replacement state.

6. A method according to claim 1, wherein the momentum refreshment process and/or the conservative dynamics process constitutes a multiple iteration process, in which the entire process is repeated a selected number of times consecutively, to provide a final resulting state, which may be used as a current state for the next process.

7. A method according to claim 1, wherein the states in the method are denoted by $\Omega_i = (Y_i^T, t_i)^T$, i=0, ..., I, where I is a given integer, $Y_i = (X_i^T, 1, P_i^T, b_i)^T$, $X_i$ is a collective vector of atomic positions, $P_i$ is a collective vector of atomic momenta, $b_i$ is a scalar, and $t_i$ is time and wherein the conservative dynamics operation comprises applying the multiple time stepping method to the current state $\overline{\Omega}^+_i = (\overline{Y}_i^T, t_i)^T$ with $\overline{Y}_i = (X_i^T, 1, \overline{P}_i^T, b_i)^T$ using a time-reversible and volume conserving mapping $\hat{\Psi}_\tau$, with the proposed state being defined by:

$$\hat{\Omega}_i = (\hat{Y}^T, t_i + L\Delta t)^T, \text{ with } \hat{Y}_i = \hat{\Psi}_\tau(\overline{Y}_i)$$

with $\tau = \Delta t L$ and given integer $L \geq 1$; and preferably wherein the subsequent acceptance and rejection operation comprises obtaining the resulting state $\Omega_{i+1}$ through a Metropolis accept/reject criterion:

$$\Omega_{i+1} = \begin{cases} \hat{\Omega}_i & \text{with probability min}(1, \exp(-\beta \Delta H_{\Delta t})) \\ \overline{\Omega}^{\pm}_i & \text{otherwise,} \end{cases}$$

with $$\Delta H_{\Delta t} := H_{\Delta t}(\hat{X}_i, \hat{P}_i) - H_{\Delta t}(X_i, \overline{P}_i),$$

in which $H_{\Delta t}$ is the shadow Hamiltonian and $\Delta H_{\Delta t}$ is the change in shadow Hamiltonian due to the conservative dynamics operation; and in which $\overline{\Omega}_i^- = (\overline{Y}_i^{-T}, t_i)^T$, $\overline{Y}_i^- = (X_i^T, 1, -\overline{P}_i^T, b_i)^T$, wherein $\overline{\Omega}_i^\pm$ denotes either $\overline{\Omega}_i^+$ or $\overline{\Omega}_i^-$ in which $\overline{\Omega}_i^-$ indicates applying a momentum flip to the state $\overline{\Omega}_i$ and $\overline{\Omega}_i^+ = \overline{\Omega}_i$ and indicates that no momentum flip has been applied.

8. A method according to claim 1, wherein the shadow Hamiltonian used can be expressed as:

$$H_{\Delta t}^{[q]} = H_{\Delta t}^{[q], MTS} - H_{\Delta t}^{[q], MTS, fast} + H_{\delta t}^{[q], SV, fast},$$

in which $H_{\Delta t}^{[q], MTS}$ denotes the q th order shadow Hamiltonian for an MTS method, $H_{\Delta t}^{[q], MTS, fast}$ denotes the q th order shadow Hamiltonian for the same MTS method with the more slowly varying forces $F^{slow}$ set equal to zero and $H_{\delta t}^{[q], SV, fast}$ denotes the q th order shadow Hamiltonian for a Störmer-Verlet method applied to the more quickly varying forces in the system, with stepsize $\delta t$.

9. A method according to claim 1, further comprising a step of initially accepting input of simulation conditions, wherein the simulation conditions include at least one of volume, mass, temperature, pressure, number of particles, and total energy; and/or further comprising a step of initially accepting input of simulation parameters, wherein the simulation parameters include at least one of a number of repetitions of the momentum refreshment process and a number of repetitions of the conservative dynamics process, the larger and smaller time step in conservative dynamics, the number of iterations of the entire method, the current state for the first step in the method, the force field parameters, a time-reversible and volume conserving mapping $\Psi_\tau$, and a constant angle $\phi$, where $0 < \phi \leq \pi/2$.

10. A method according to claim 1, including the step of displaying the results on a screen or printout.

11. A method of molecular simulation of a system over time comprising:

modeling, using a processor, the system using an atomistic model;

carrying out the method of simulating behaviour of a thermodynamic system according to claim 1; and analysing the results obtained from the simulation and relating them to macroscopic level properties.

12. A method according to claim 11, further comprising using the relationship of the results to the macroscopic properties to assess and optionally modify the system at the macroscopic level, before repeating the method on the modified system.

13. An apparatus which simulates behaviour of a thermodynamic system over time, the thermodynamic system having potential energy that can be split into more quickly varying parts and more slowly varying parts and having a state described by collective vectors of position and momentum at any given time; the apparatus comprising:

a processor, comprising:

a momentum refreshment part operable to carry out an operation of mixing the collective momentum vector with a noise vector and an acceptance and rejection operation;

a conservative dynamics part operable to apply a multiple time stepping conservative dynamics operation to a current state, in which operation calculations for forces corresponding to more slowly varying energy parts in the thermodynamic system undergo an averaging procedure and are carried out at a larger time step than calculations for forces corresponding to more quickly varying energy parts; and to carry out an acceptance and rejection operation; wherein the acceptance and rejection operations are based on an approximation of the system energy expressed using shadow Hamiltonians and comprise accepting a current state or returning a replacement state, wherein the states are denoted by $\Omega_i = (Y_i^T, t_i)^T$, i=0, ..., I, where I is a given integer, $Y_i = (X_i^T, 1, P_i^T, b_i)^T$, $X_i$ is a collective vector of atomic positions, $P_i$ is a collective vector of atomic momenta, $b_i$ is a scalar, and $t_i$ is time and wherein the mixing operation comprises: given a current state, mixing its collective atomic momentum vector $P_i$ with an independent and identically distributed normal noise vector $\Xi_i$ of dimension 3N, so that $$\tilde{P}_i = \cos(\phi) P_i + \sin(\phi) \Xi_i,$$

$$\tilde{\Xi}_i = \cos(\phi) \Xi_i - \sin(\phi) P_i,$$

where i is a given integer, N is the number of particles in the system, $0 < \phi \leq \pi/2$ is a given angle, $\Xi_i \sim N[0, \beta M^{-1}]$, $N[0, \beta M^{-1}]$ denotes the (3N)-dimensional normal distribution with zero mean and covariance matrix $\beta M^{-1}$, M is the diagonal mass matrix of the molecular system, and $\beta = 1/k_B T$ is the inverse temperature, proposed vector being denoted by $\tilde{\Omega}_i = (\tilde{Y}_i^T, t_i)^T$, $\tilde{Y}_i = (X_i^T, 1, \tilde{P}_i^T, b_i)^T$; and preferably wherein the subsequent acceptance/rejection operation comprises obtaining the resulting state $\overline{\Omega}_i$; through a Metropolis accept/reject criterion:

$$\overline{\Omega}_i = \begin{cases} \tilde{\Omega}_i & \text{with probability min }(1, \exp(-\beta \Delta H_{\Delta t}^e)) \\ \Omega_i & \text{otherwise,} \end{cases}$$

with $$\Delta H_{\Delta t}^e := H_{\Delta t}(X_i, \tilde{P}_i) + \frac{1}{2} \tilde{\Xi}_i^T M^{-1} \tilde{\Xi}_i - H_{\Delta t}(X_i, P_i) - \frac{1}{2} \Xi_i^T M^{-1} \Xi_i,$$

in which $H_{\Delta t}$ is the shadow Hamiltonian and $\Delta H_{\Delta t}^e$ is the change in shadow Hamiltonian due to the mixing operation.

14. A non-transitory computer-readable medium storing a computer program which, when executed on a processor, carries out a computer-implemented method of simulating behaviour of a thermodynamic system over time, the thermodynamic system having potential energy that can be split into more quickly varying parts and more slowly varying parts and having a state described by collective vectors of position and momentum at any given time, the method comprising a momentum refreshment process and a conservative dynamics process, wherein the momentum refreshment process comprises carrying out an operation of mixing the collective momentum vector with a noise vector and carrying out an acceptance and rejection operation;

the conservative dynamics process comprises applying a multiple time stepping conservative dynamics operation to a current state, in which operation calculations for forces corresponding to more slowly varying energy parts in the thermodynamic system undergo an averaging procedure and are carried out at a larger time step than calculations for forces corresponding to more quickly varying energy parts; and carrying out an acceptance and rejection operation; wherein the acceptance and rejection operations are based on an approximation of the system energy expressed using shadow Hamiltonians and comprise accepting a current state or returning a replacement state, wherein the states are denoted by $\Omega_i=(Y_i^T,t_i)^T$, $i=0,\ldots,I$, where I is a given integer, $Y_i=(X_i^T,1,P_i^T,b_i)^T$, $X_i$ is a collective vector of atomic positions, $P_i$ is a collective vector of atomic momenta, $b_i$ is a scalar, and $t_i$ is time and wherein the mixing operation comprises: given a current state, mixing its collective atomic momentum vector $P_i$ with an independent and identically distributed normal noise vector $\Xi_i$ of dimension 3N, so that $$\tilde{P}_i = \cos(\phi)P_i + \sin(\phi)\Xi_i,$$

$$\tilde{\Xi}_i = \cos(\phi)\Xi_i - \sin(\phi)P_i,$$

where i is a given integer, N is the number of particles in the system, $0<\phi\leq\pi/2$ is a given angle, $\Xi_i \sim N[0,\beta M^{-1}]$, $N[0,\beta M^{-1}]$ denotes the (3N)-dimensional normal distribution with zero mean and covariance matrix $\beta M^{-1}$, M is the diagonal mass matrix of the molecular system, and $\beta=1/k_B T$ is the inverse temperature, proposed vector being denoted by $\tilde{\Omega}_i=(\tilde{Y}_i^T,t_i)^T$, $\tilde{Y}_i=(X_i^T,1,\tilde{P}_i^T,b_i)^T$; and preferably wherein the subsequent acceptance/rejection operation comprises obtaining the resulting state $\overline{\Omega}_i$; through a Metropolis accept/reject criterion:

$$\overline{\Omega}_i = \begin{cases} \tilde{\Omega}_i & \text{with probability } \min(1, \exp(-\beta\Delta H_{\Delta t}^e)) \\ \Omega_i & \text{otherwise,} \end{cases}$$

with $$\Delta H_{\Delta t}^e := H_{\Delta t}(X_i, \tilde{P}_i) + \frac{1}{2}\tilde{\Xi}_i^T M^{-1}\tilde{\Xi}_i - H_{\Delta t}(X_i, P_i) - \frac{1}{2}\Xi_i^T M^{-1}\Xi_i,$$

in which $H_{\Delta t}$ is the shadow Hamiltonian and $\Delta H_{\Delta t}^e$ is the change in shadow Hamiltonian due to the mixing operation.

* * * * *